Aug. 10, 1965  J. R. SCHNEIDER  3,199,677
FILTER AID FEED SYSTEM
Filed Feb. 19, 1960  2 Sheets-Sheet 1

INVENTOR.
JOHN R. SCHNEIDER
BY
Busser, Smith & Harding
ATTORNEYS

INVENTOR.
JOHN R. SCHNEIDER

United States Patent Office 3,199,677
Patented Aug. 10, 1965

3,199,677
FILTER AID FEED SYSTEM
John R. Schneider, Belvedere, Calif., assignor, by mesne assignments, to De Laval Turbine Inc., Trenton, N.J., a corporation of Delaware
Filed Feb. 19, 1960, Ser. No. 9,876
11 Claims. (Cl. 210—128)

This application relates generally to filtering plants and more particularly to improvements in apparatus for automatically feeding filter aid.

Some substances have properties which make them useful as filter aids in filtering processes. Diatomaceous earth is a substance widely used for this purpose. A good filter aid must have at least these two properties: (1) the ability to "bridge" over openings many times the particle size; and (2) sufficient porosity to prevent the filtered solids from "sealing" the filter cake when added as a "body feed."

A filter aid is applied to the filter septum in two steps: (1) precoat; and (2) body feed.

The filter septum is typically precoated at the start of a run by feeding a large amount of filter aid into the filter in a short time, for example, about three minutes, the feed being, say, 0.10 pound of filter aid per square foot of filter area, to form a precoat of about 1/16 of an inch depth on the septum. The filter aid bridges the openings in the septum and builds up the precoat cake. Filtering begins after precoating.

Solids are deposited on the surface of the precoat cake as they are removed from the liquid. Filter aid is now fed into the filter continuously in very small amounts to prevent the filtered solids from building up an impervious layer which would quickly build up the pressure and terminate the run. Filter aid used in this manner is called "body feed." It accomplishes its purpose simply by mixing with the solids to be filtered while they are still suspended in the liquid, in sufficient quantity so that when the resulting mixture of these solids is deposited on the filter cake it will be sufficiently porous to build up the desired thickness of cake without producing a pressure drop and consequently the flow rate desired.

The body feed must be accurate, continuous and adjusted proportionately to the concentration of solids in the influent.

A field man makes regular visits to add filter aid to the slurry tank, take samples and adjust body feed rate. The longer the apparatus will operate properly without attention, the longer the periods between visits and the less costly the operation of the apparatus.

The filter aid feeding system must have the following characteristics: (1) adequate storage capacity for at least one day at maximum usage; (2) automatic precoating; (3) accurate body feed rate; (4) wide enough range of body feed rate to meet the range of turbidity expected; (5) dependability; (6) easily adjustable feed rates.

One of the most useful characteristics of diatomaceous earth as a filter aid is its tendency to bridge, but this characteristic also creates most of the feeding problems in known systems, e.g., bridging, settling and clogging. Accordingly, among the important objects of the present invention is to provide improved apparatus for automatically feeding filter aid whereby the problems of bridging, settling and clogging are eliminated.

A further object is to solve the problems aforesaid by making the flow of fluid through the feed lines continuous, velocities high, flow patterns smooth, openings large, and slurry concentrations low, and by flushing lines continuously.

Known filter aid slurry feeders normally operate with 2-5 percent slurry, in consequence of which unduly large slurry tanks would be required for automatic operation, which requires storage of sufficient slurry to last a minimium of 24 hours. Normally, relatively small slurry tanks are utilized, which means that they must be refilled frequently, and that operators must be constantly in attendance for doing so. Accordingly, another object of the present invention is to provide a slurry feeder that effectively handles slurries containing at least 20 percent solids and thereby makes storage of sufficient slurry for automatic operation possible, without requiring unduly large slurry tanks.

The higher the percentage of the slurry effectively handled by the feeder, the more compact the feeder. Accordingly, still another object of the present invention is to raise the slurry percentage sufficiently so that a slurry feeder may be made more compact than a dry type feeder of comparable capacity.

Other objects of the present invention will appear more fully hereinafter.

Figure 1:
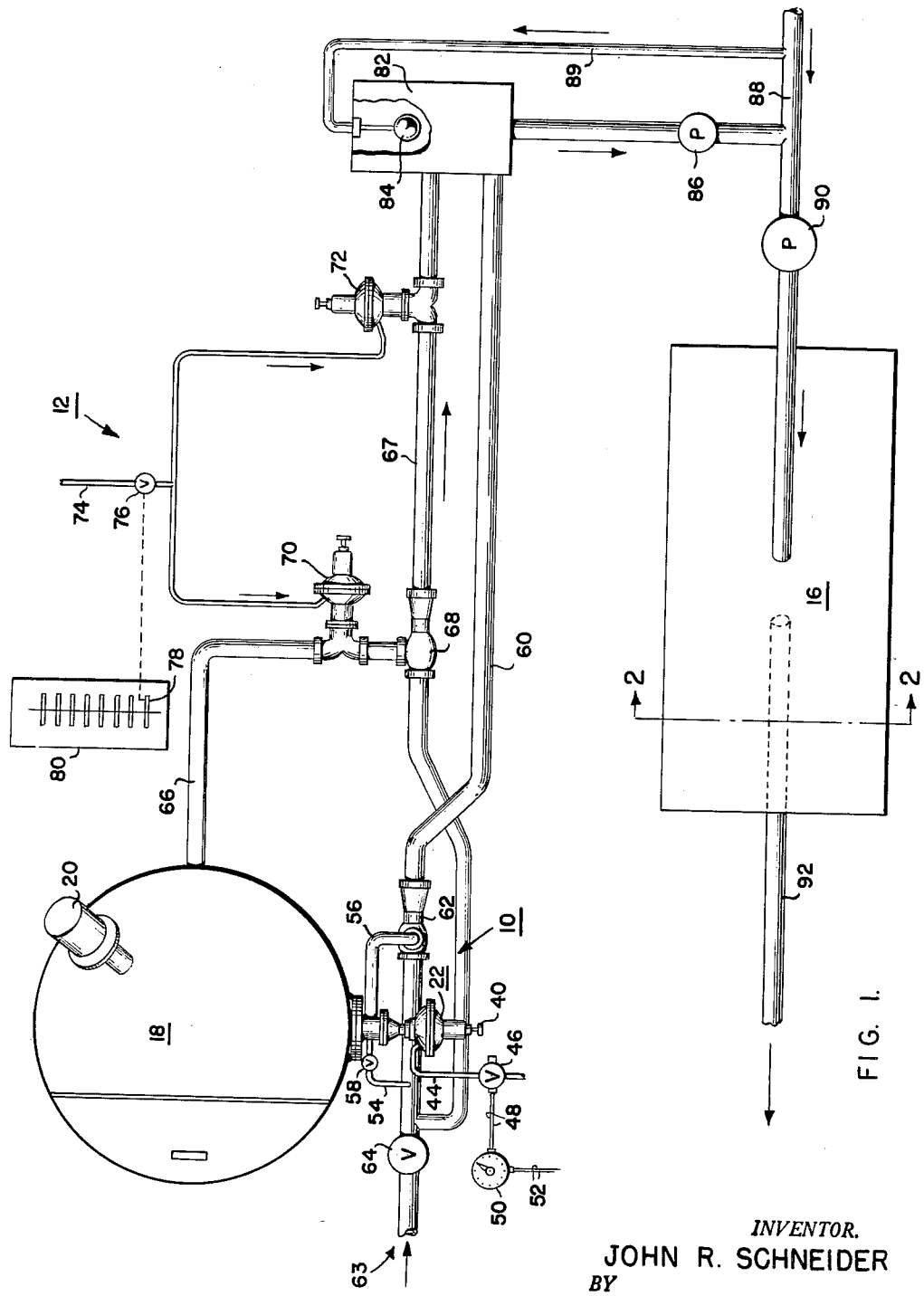
FIGURE 1 is a diagrammatic plan view of the system as a whole.

Referring to the drawing, and particularly to FIGURE 1, the exemplary filter system constructed in accordance with and embodying the principles of the present invention comprises a filter aid body feed system and a precoat system, a booster system and a filter tank.

Figure 3:
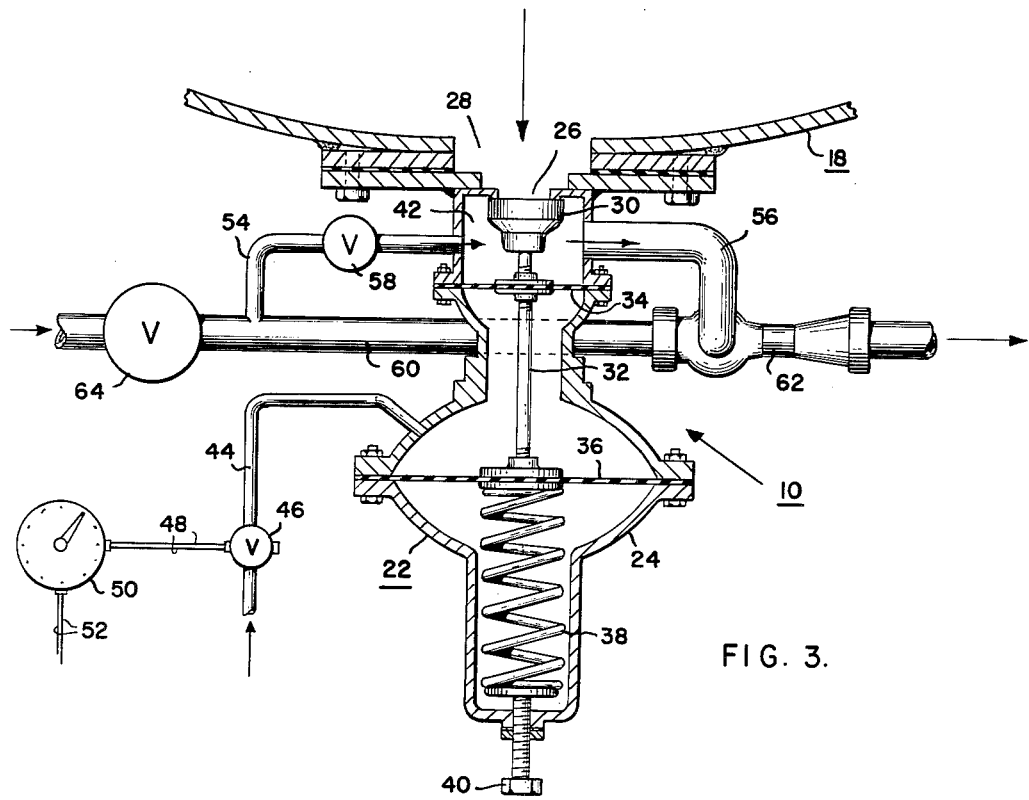
FIGURE 3 is a horizontal section taken through the body feeder.
Figure 4:
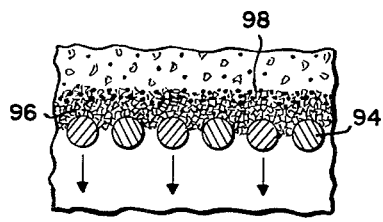
FIGURE 4 is an enlarged vertical section taken through a portion of the filter cake.
Figure 2:
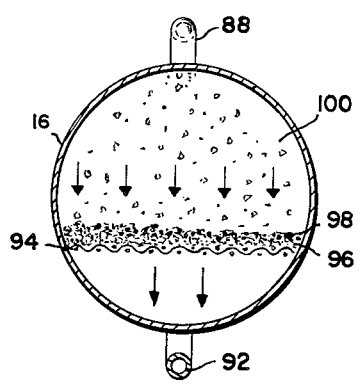
FIGURE 2 is a vertical section through the filter tank on line 2—2 in FIGURE 1.

Referring particularly to FIGURES 1 and 3, the body feed system, generally designated 10, includes a slurry tank 18, a mixer 20 and a body feed valve unit 22. The body feed valve unit has a body 24 at the base of which is an inlet opening 26 registering with a slurry tank discharge opening 28. Over the opening 26 is a valve 30 carried by a stem 32 held in place by a cross-axially extending diaphragm 34 near the valve 30, and a cross-axially extending diaphragm 36 remote from the valve 30. Within the top section of the valve body 24, on the side of the diaphragm 36 remote from the diaphragm 34, is a compression spring 38, and extending through the top of the valve body 24 is an adjusting screw 40. The valve 30 is disposed within a valve chamber 42 extending between the base wall of the valve body 24 and the diaphragm 34. Connected into the side of the valve body 24 between the diaphragms 34 and 36 is a line 44 for control medium having connected therein a three-way solenoid control valve 46, which control valve is suitably connected by a line 48 to a percentage timer 50 supplied with electric power through a line 52. Connected into one side of the chamber 42 is the upstream section 54 of a flush and dilute line, and connected into the other side of the chamber 42 is the downstream section 56 of the flush and dilute line. The upstream section 54 of the flush and dilute line is provided with a flow regulating valve 58. The upstream section 54 of the flush and dilute line is connected into a pressure liquid line 60, and the downstream section 56 of the flush and dilute line is connected into an eductor 62, which in turn is connected into the pressure liquid line 60, which additionally is provided with a pressure regulating valve 64.

Percentage timer 50 alternately opens and closes electrical circuits to three-way solenoid valve 46, which alternately admits and vents control medium (50 pounds per square inch air or water) to and from the valve unit 22, which opens and closes slurry valve 30 to intermittently admit slurry from tank 18 into the valve chamber 42 from which the slurry is drawn into the eductor 62.

Liquid flows through the main conduit or pressure liquid line 60 to operate the eductor 62 and discharges into the booster system. This liquid is kept at a constant pressure as it enters the body feed system by pressure regulating valve 64 in order to maintain a constant suction pressure at the suction inlet of the eductor.

Liquid flows through flow regulating valve 58 in the flush and dilute liquid line 54 into valve chamber 42, where it performs its flushing and diluting function, into the eductor 62 and then on to the booster system. The flow regulating valve 58 maintains a constant flow of liquid at all times during operation of the body feed system. This liquid flushes the slurry valve chamber 42 when the valve 30 is closed and dilutes the slurry when the valve 30 is open.

The feed rate is adjusted by turning the percentage timer to any point between 0 and 100%. The dial can be calibrated in any convenient unit of feed rate, such as, pounds per hour or pounds per day. Preferably a thirty seconds timer, i.e., a timer that goes through a complete cycle in thirty seconds, is used, but in some cases it may be desirable to use a fifteen seconds or sixty seconds timer. As shown, this adjustment is made manually. However, it can be made by a suitable servo mechanism in response to a signal from a turbidity meter in the influent line.

The precoat system, generally designated 12, includes a line 66 leading from a second slurry tank outlet to an eductor 68 connected in a pressure liquid line 67, which line 67 preferably is tied into the line 60 after the pressure regulating valve 64. Connected in the line 66 is a precoat valve unit 70. Connected in the pressure line 67, on the downstream side of the eductor 68 is a valve 72. The valve units 70 and 72 are essentially of the same type as valve 22, already described. The valve units 70 and 72 have associated therewith a line 74 for control medium, branches of the latter being connected into the valve units between the diaphragms thereof. The line 74 has connected therein a three-way solenoid valve 76, which is controlled by a cam 78 of a suitable filter programmer 80, which is also provided with other cams operating to control a suitable electrical system (not shown) through the medium of which the various valves and pumps of the filter are operated in predetermined sequence, as will appear.

The cam 78 of the filter programmer 80 closes the electrical circuit to three-way solenoid valve 76, which causes the latter to open, admitting control medium to spring loaded diaphragm valves 70 and 72, which causes them to open. Valve 72 allows pressure liquid to flow through precoat eductor 68, and this in turn draws slurry through valve 70 into the eductor 68 and discharges the diluted slurry into the booster system. The cam 78 is designed to allow precoat feeding to continue long enough to put the proper amount of filter aid into the filter for precoating. Then cam 78 opens the electrical circuit, closing the solenoid valve and the diaphragm operated valves, which stops the precoat feeding and flow through the eductor 68.

The spring of the unit 70 is adjusted to close its associated valve after the valve of the unit 72 closes so that when the valve of the unit 72 closes pressure liquid is forced backwardly through the suction of the eductor 68 and through unit 70 into the tank 18 for a second or two. This purges the residual slurry from the system which prevents plugging due to filter aid settling in the line. The spring of the unit 70 is also arranged for opening of its associated valve before the valve of the unit 72 opens so that upon starting the precoat operation, the valve of the unit 70 opens first and the eductor 68 and the unit 70 are flushed again by reverse flow.

The pressure liquid lines 60 and 67 discharge into a tank 82 vented to atmosphere. A booster pump 86 pumps from the tank 82 into the influent line 88 through which flows the liquid to be filtered. Make-up liquid is taken from the influent line 88 and supplied to the tank 82 through a make-up line 89. The latter is fitted with a float valve, generally designated 84, which operates to keep the liquid in the tank 82 at a constant level. A high pressure booster pump 86 is used to pump filter aid from the tank 82 and to feed the same into the influent line 88, which may have high inlet pressures. From a pressure standpoint, the tank 82 isolates the pump 86 from the lines 60 and 67, in consequence of which the lines 60 and 67 discharge against constant pressure to make the eductor feed rate as accurate as possible. The influent line 88 is provided with a filter pump 90, which pumps the influent into the filter tank 16, which is drained through a line 92. Within the filter tank there is mounted a filter screen or septum 94 upon which there builds up a precoat and the body feed, respectively designated 96 and 98, the influent being designated 100.

With regard to the sequence of operation, it may be assumed that at the beginning of a run, there is no flow of liquid through the line 60 or the line 67. After a rinsing step as is well-known in the art, precoating begins, in the manner now to appear, it being assumed that at this point in the operation of the system, the control valve 76 is closed, in consequence of which the valves 70 and 72 are closed. During precoating, float valve 84 operates to keep the tank 82 at a constant level.

The control valve 76 opens to supply control medium to the valves 70 and 72. The valve 70 opens and shortly thereafter the valve 72 opens, as stated hereinbefore, in consequence of which first pressure liquid entering at 68 flows through lines 67 and 66 into tank 18, then, when the valve 72 opens, slurry flows from the tank 18 through the line 66 into the line 67 and is carried by the pressure liquid to the tank 82.

After approximately three minutes, at the end of the precoating operation, the control valve 76 operates to cut off the supply of control medium to valves 70 and 72, whereupon the valve 72 closes, cutting off the flow of pressure liquid through the line 67 to the tank 82, and shortly thereafter the valve 70 closes, cutting off the flow of pressure liquid in the line 67 altogether. During the interval between the closing of the valve 72 and the closing of the valve 70, pressure liquid flows through the lines 67 and 66 into tank 18. After precoating, body feeding begins, in the manner now to appear, it being assumed that at this point in the operation of the system the control valve 46 is closed, in consequence of which the valve 22 is closed.

The control valve 46 opens to supply control medium to the unit 22, whereupon the valve 30 of the unit operates at predetermined intervals, as determined by the timer 50. Simultaneously liquid to be filtered is supplied through the line 88 to the pump 90, which pumps the same into the tank 16 for treatment therein. At the same time, liquid to be filtered is supplied through the make-up line 89 to the tank 82.

After a predetermined time, at the end of the body feed operation, the control valve 46 closes, whereupon the valve 30 closes, cutting off the supply of body feed. After the body feeding operation, flow in the forward direction is interrupted and backwashing begins. When the backwashing operation is completed the system has completed a cycle of operation. It is deemed to be unnecessary for a clear understanding of the present invention to treat the sequence of operation in further detail.

By tracing the slurry path through the body feeder, it can be seen how it is impossible for it to fail by plugging. The mixer 20 keeps the slurry suspended in the slurry tank 18. The valve 30 is mounted with its inlet port 26 exposed to the circulating motion of the slurrying. Immediately upon entering the chamber 42 the slurry is diluted by a constant stream of liquid. The amount of dilution varies with the feed rate. For example, at a feed rate of 12 lb. per hr., which would be average for a 900 g.p.m. filter, the slurry would be diluted from one containing 20 percent solids to one containing about 3 percent solids. Upon entering the eductor 62, the solids content of the slurry is further reduced to about one percent in our example. When it enters the tank 82, the solids content is again reduced, to 0.20 percent in our example. When the valve 30 is closed, a stream of liquid continuously flushes the chamber 42 and the suction line of the eductor 62. The pressure liquid flows continuously, which flushes the eductor 62 and the line 60, and all of the liquid from the eductor and the make-up liquid together flush the tank 82, the booster pump 86 and the line from the pump 86 to the filter system inlet.

The precoat feed system has all of the advantages of the body feed system. However, as previously described, it has a different flushing method. No diluting is necessary in the valve 70 because velocities are kept high and the flow is continuous while precoating.

The feeder system of the present invention will handle slurries containing at least 20 percent solids dependably while known feeder systems operate only with slurries containing 2–5 percent solids.

Dry diatomaceous earth is very bulky due to its porosity, but has a specific gravity of two and absorbs over twice its weight in water. Theoretically, therefore, a given weight of diatomaceous earth can be stored dry or as a slurry having a solids content of about 30 percent, in the same volume. However, in practice, the sloping bottoms and dissolving tank which are required for dry feeders make the latter type of system more bulky than a slurry system capable of handling a slurry with a solids content of 20 percent.

Adequate filter aid storage capacity must be provided for automatic filters which operate continuously so that only one filling per twenty-four hour day is required. For example, in the case of a filter system constructed in accordance with the present invention, and using a 20 percent solids slurry, a six-hundred gallon slurry tank may be provided for a 900 g.p.m. filter. If a 5 percent solids slurry were used, a tank four times this size would be required, or the supply would have to be replenished more frequently. This latter practice is usual, since filters are usually manually operated and operators are in attendance. However, this defeats the purpose of automatic filtration.

The body feed system is capable of feeding 0.50 lb. per hour to 70 lbs. per hour of diatomaceous earth, based on a 20 percent solids slurry. This feed rate range is several times greater than that of known slurry feeders and is also greater than all but the most expensive dry feeders. This means that one size of body feeder may be furnished for a wide range of filters (25 g.p.m. to 1800 g.p.m.)

The body feed is easily adjusted through its entire range by turning the percentage timer dial. It is also possible to widen the range by changing the slurry concentration. This is a distinct advantage in handling the very low feed rate required on small filters, and it is an advantage the dry feeders do not have. Other slurry feeders make the adjustment by changing the length of stroke of the pumps, which is not satisfactory because it affords very little adjustment, is cumbersome, and time-consuming, and requires skilled operators.

The accuracy of feed rate is very high because the eductor pressure liquid is controlled, the eductor discharges to atmosphere, the flush and dilute water is controlled by a constant flow regulator and the percentage timer is very accurate in its action.

The precoat feeder is very accurate because the pressure liquid is controlled and the eductor discharges to atmosphere, and the cam timer repeats very accurately. The precoat feed system is capable of feeding up to 40 lbs. per minute, in consequence of which an 1800 gallon per minute filter can be precoated in 3 minutes, drawing from the slurry tank, which makes automatic precoating practical.

It will be understood, of course, that the present invention is susceptible of various changes and modifications which may be made from time to time without departing from the real spirit or general principles thereof, and it is accordingly intended to claim the same broadly as well as specifically, as indicated in the appended claims.

What is claimed is:

1. In combination, a filter having a septum, means for supplying liquid to be filtered to said septum, and means for supplying a suspension of filter aid to said septum, the last mentioned means including a source of filter aid suspension, a conduit for conducting said filter aid suspension to said septum, an eductor in said conduit, a second conduit including a valve connecting said source of filter aid with the suction of said eductor, and means for supplying diluting liquid to said second conduit immediately downstream of said valve to flush the same.

2. In combination, a filter having a septum, means for supplying liquid to be filtered to said septum, and means for supplying a suspension of filter aid to said septum, the last mentioned means including a source of filter aid suspension, a conduit for conducting said filter aid suspension to said septum, an eductor in said conduit, a second conduit including a valve connecting said source of filter aid with the suction of said eductor, means for operating said valve intermittently, and means for supplying diluting liquid to said valved conduit between its valve and the suction of said eductor to flush said valve.

3. In combination, a filter having a septum, means for supplying liquid to be filtered to said septum, and means for supplying a suspension of filter aid to said septum, the last mentioned means including a source of filter aid suspension, a conduit for conducting said filter aid suspension to said septum, an eductor in said conduit, a second conduit including a valve connecting said source of filter aid with the suction of said eductor, means for supplying diluting liquid to said second conduit immediately downstream of said valve for flushing the same and means for maintaining a constant pressure drop across said eductor.

4. In a combination, a filter having a septum, means for supplying liquid to be filtered to said septum, and means for supplying a suspension of filter aid to said septum, the last mentioned means including a source of filter aid suspension, a conduit for conducting said filter aid suspension to said septum, an educator in said conduit, a second conduit including a valve connecting said source of filter aid with the suction of said eductor, means for supplying diluting liquid to said second conduit between its valve and the suction of said eductor and means maintaining a constant pressure drop across said eductor.

5. In combination, a filter having a septum, means for supplying liquid to be filtered to said septum, and means for supplying a suspension of filter aid to said septum, the last mentioned means including a source of filter aid suspension, a first conduit for conducting said filter aid suspension to said septum, an eductor connected in said first conduit, a valve connected in said first conduit on the downstream side of said eductor, a second conduit connecting said source of filter aid with the suction of said eductor, a valve connected in said second conduit, and means causing delayed action opening of said first conduit valve relative to said second conduit valve, and delayed action closing of the latter relative to said first conduit valve.

6. In combination, a filter having a septum, means for supplying liquid to be filtered to said septum, and means for supplying a suspension of filter aid to said septum, the last mentioned means including a source of filter aid suspension, a first conduit for conducting said filter aid suspension to said septum, an eductor connected in said first conduit, means for maintaining a constant pressure drop across said eductor, a valve connected in said first conduit on the downstream side of said eductor, a second conduit connecting said source of filter aid with the suction of said eductor, a valve connected in said second conduit, and means causing delayed action opening of said first conduit valve relative to said second conduit valve, and delayed action closing of the latter relative to said first conduit valve.

7. In combination, a filter having a septum, means for supplying liquid to be filtered to said septum, and means for supplying a suspension of filter aid to said septum, the last mentioned means including a source of filter aid suspension, a first conduit for conducting said filter aid suspension to said septum, an eductor connected in said first conduit, means for maintaining a constant pressure drop across said eductor including means providing for discharge of the latter against a constant pressure, a valve connected in said first conduit on the downstream side of said eductor, a second conduit connecting said source of filter aid with the suction of said eductor, a valve connected in said second conduit, and means automatically causing delayed action opening of said first conduit valve relative to said second conduit valve, and delayed action closing of the latter relative to said first conduit valve.

8. In combination, a filter having a septum, means for supplying liquid to be filtered to said septum, a filter aid body feed system including a source of filter aid suspension, a first conduit for conducting said filter aid suspenpension to said septum, an eductor in said first conduit, an auxiliary conduit including a valve connecting said source of filter aid suspension with the suction of said eductor, and means for supplying diluting liquid to said auxiliary conduit between its valve and the suction of said eductor, and a precoat system including a second conduit for conducting said filter aid suspension to said septum, an eductor connected in said second conduit, a valve connected in said second conduit on the downstream side of said eductor, a second auxiliary conduit connecting said source of filter aid suspension with the suction of the last mentioned eductor, a valve connected in said second auxiliary conduit, and means causing delayed action opening of said second conduit valve relative to said second auxiliary conduit valve, and delayed action closing of the latter relative to said second conduit valve.

9. In combination, a filter having a septum, means for supplying liquid to be filtered to said septum, a filter aid body feed system including a source of filter aid suspension, a first conduit for conducting said filter aid suspension to said septum, an eductor in said first conduit, an auxiliary conduit including a valve connecting said source of filter aid suspension with the suction of said eductor, and means for supplying diluting liquid to said auxiliary conduit between its valve and the suction of said eductor to flush said valve, a precoat system including a second conduit for conducting said filter aid suspension to said septum, an eductor connected in said second conduit, a valve connected in said second conduit on the downstream side of said eductor, a second auxiliary conduit connecting said source of filter aid suspension with the suction of the last mentioned eductor, a valve connected in said second auxiliary conduit, and means causing delayed action opening of said second conduit valve relative to said second auxiliary conduit valve, and delayed action closing of the later relative to said second conduit valve, and means providing for discharge of said eductors against a constant pressure.

10. In combination, a filter having a septum, means for supplying liquid to be filtered to said septum, a filter aid body feed system including a source of filter aid suspension, a first conduit for conducting said filter aid suspension to said septum, an eductor in said first conduit, an auxiliary conduit including a valve connecting said source of filter aid suspension with the suction of said eductor, and means for supplying diluting liquid to said auxiliary conduit between its valve and the suction of said eductor, a precoat system including a second conduit for conducting said filter aid suspension to said septum, an eductor connected in said second conduit, a valve connected in said second conduit on the downstream side of said eductor, a second auxiliary conduit connecting said source of filter aid suspension with the suction of the last mentioned eductor, a valve connected in said second auxiliary conduit, and means causing delayed action opening of said second conduit valve relative to said second auxiliary conduit valve, and delayed action closing of the latter relative to said second conduit valve, and a float controlled tank open to atmosphere, connected in said first and second conduits downstream of said eductors and upstream of said septum, and providing a constant head of liquid against which said eductors discharge.

11. In combination, a filter having a septum, means for supplying liquid to be filtered to said septum, a filter aid body feed system including a source of filter aid suspension, a first conduit for conducting said filter aid suspension to said septum, an eductor in said first conduit, an auxiliary conduit including a valve connecting said source of filter aid suspension with the suction of said eductor, and means for supplying diluting liquid to said auxiliary conduit between its valve and the suction of said eductor, a precoat system including a second conduit for conducting said filter aid suspension to said septum, an eductor connected in said second conduit, a valve connected in said second conduit on the downstream side of said eductor, a second auxiliary conduit connecting said source of filter aid suspension with the suction of the last mentioned eductor, a valve connected in said second auxiliary conduit, and means automatically causing delayed action opening of said second conduit valve relative to said second auxiliary conduit valve, and delayed action closing of the latter relative to said second conduit valve, a float controlled tank open to atmosphere, connected in said first and second conduits downstream of said eductors and upstream of said septum, and receiving the discharge from said eductors, and means supplying additional diluting liquid to said tank, said float being operative to provide a constant head of liquid against which said eductors discharge.

References Cited by the Examiner

UNITED STATES PATENTS

| | | | |
|---|---|---|---|
| 1,474,757 | 11/23 | Bingay | 137—628 XR |
| 2,210,719 | 8/40 | Hodges | 210—193 XR |
| 2,423,172 | 7/47 | Booth | 210—75 XR |
| 2,446,373 | 8/48 | Klein | 210—193 XR |
| 2,570,131 | 10/51 | Koupal | 210—75 |
| 2,641,574 | 6/53 | Arthurs | 210—193 XR |
| 2,768,747 | 10/56 | Hugel et al. | 210—193 XR |

FOREIGN PATENTS

| | | |
|---|---|---|
| 9,665 | 1/09 | Great Britain. |
| 777,001 | 6/57 | Great Britain. |

OTHER REFERENCES

"Niagara Filters," Niagara Filter Corporation, copyright 1947, pages 8 and 9, Buffalo 14, N.Y.

REUBEN FRIEDMAN, *Primary Examiner.*

HERBERT L. MARTIN, *Examiner.*